Sept. 26, 1967 C. F. STUTE 3,343,853

KNOCK DOWN CABINET ASSEMBLY CLIP

Filed April 29, 1965

Inventor
CARLTON F. STUTE

By Nicholas A Camasto

Atty.

United States Patent Office 3,343,853
Patented Sept. 26, 1967

3,343,853

KNOCK DOWN CABINET ASSEMBLY CLIP

Carlton F. Stute, Riverdale, Ill., assignor to Admiral Corporation, Chicago, Ill., a corporation of Delaware Filed Apr. 29, 1965, Ser. No. 451,847
5 Claims. (Cl. 287—20.92)

ABSTRACT OF THE DISCLOSURE

A resilient clip for use in assembling prefabricated television receiver cabinets which are transported and stored in a disassembled condition until necessary for production. The resilient clip is securely fastened to one side wall and cooperates with kerfs provided in an adjacent side wall, to rigidly maintain the walls in a fixed relationship.

This invention relates in general to prefabricated enclosures, and in particular to precut, preformed, and pre-finished cabinets for television receivers. More particularly, the invention is concerned with a means for rapidly, simply, economically, and rigidly assembling prefabricated television receiver cabinets.

It is conventional in the television manufacturing industry, to purchase the cabinets or enclosures into which the television receivers are ultimately placed for sale to the consumer. Television cabinets are generally furnished by an outside supplier who is skilled and experienced in the art of cabinet making. These cabinets are generally completely assembled by the cabinetmaker, then shipped to the production facility where they are stored in the assembled condition until required for production use.

Transportation and storage of assembled television receiver cabinets or the like, which are bulky and unwieldy, but relatively light weight due to their low average density, are expensive, inconvenient, and in general, undesirable. The expense and inconvenience are multiplied by consumer demands for a wide selection of cabinet designs, styles, and finishes which complicate storage problems at the production facility. One recognized solution to these problems is to ship and store the cabinets in an unassembled or "knock down" condition.

A knock down cabinets is one which is capable of being handled in a flat, compact, and unassembled condition, with the cabinetmaker performing all of the required cutting, tooling, routing, and finishing operations. In fact, the cabinetmaker performs all of the manufacturing operations except the actual assembly of the top, bottom, sides, and back. The cabinet can then be shipped with each of the walls stacked one on top of the other either as an entire cabinet, or separate, with each of the same walls nestled together to form a compact package. The television manufacturer may then assemble the cabinet into a finished enclosure only as necessary for production needs.

Some of the basic requirements with respect to the knock down feature of a television receiver cabinet are simplicity in manufacture, economy, ease and simplicity of assembly, and rigidity and strength of the assembled cabinet. Present knock down cabinets require various operations upon assembly, such as drilling, screwing, cutting, and gluing. These operations are performed by relatively unskilled production line employees and often result in excessive and expensive damage due to splitting and breakage of the cabinet edges. In many instances prefabricated cabinet walls are discarded subsequent to being damaged during assembly. In addition, much time is lost in working slowly enough to attempt to avoid damage, and repairing that damage which can be done so economically. Hence, it is the general purpose of this invention to eliminate the many drawbacks of prior knock down cabinet designs through the use of a unique assembly clip co-operating with a novel cabinet construction.

The assembly clip is securely fastened to one portion of the cabinet by the cabinetmaker, the remaining assembly operations merely entailing fitting and sliding the side-walls in place. This simplified fabrication method can be readily performed without fear of breakage, splitting, misalignment, or other similar production problems because drilling, screwing, cutting and gluing are eliminated. In addition the assembly clip is easy and inexpensive to manufacture and fastens to one sidewall of the cabinet in a simple, straightforward manner.

Accordingly, it is the primary object of this invention to provide a television receiver cabinet which may be shipped and stored in a knock down, compact condition.

Another object of this invention is to provide an assembly clip for use in assembling a prefabricated television receiver cabinet or the like.

A further object of this invention is to provide improved and simplified means for assembling a knock down television receiver cabinet.

A feature of this invention resides in the use of a pair of easily cut kerfs which co-operate with an assembly clip of extremely simple design in securing and fastening the several elements of a cabinet together.

The primary advantage of this invention rests in its extremely versatile application to various knock down cabinets and its novel and simple method of construction and assembly, respectively.

Other objects and advantages of this invention will become apparent upon an examination of the following description taken in conjunction with the accompanying drawings wherein.

Figure 1:
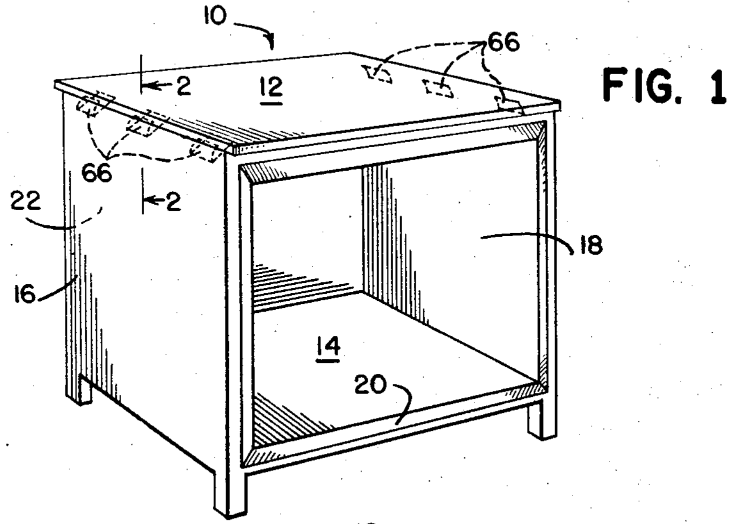
FIG. 1 is a perspective view of a television receiver cabinet illustrating an embodiment of the invention showing the placement of assembly clips for securing the top of the cabinet snugly against the side-walls of said cabinet.

FIG. 1 of the drawings, illustrating the preferred environment for the invention, shows an ordinary television receiver cabinet, generally referred to by numeral 10. It comprises a cabinet bottom wall 14, a top wall 12, and two side walls 16 and 18, each of the latter three walls manufactured of wood or a product thereof. In the preferred embodiment, a steel chassis shelf is employed as a bottom wall, although it also could be constructed of wood. These four walls comprise the basic cabinet structure, the front 20 receiving the picture tube and decorative escutcheon of a television receiver chassis, and the back 22, merely serving as covering devices.

Figures 2, 3:
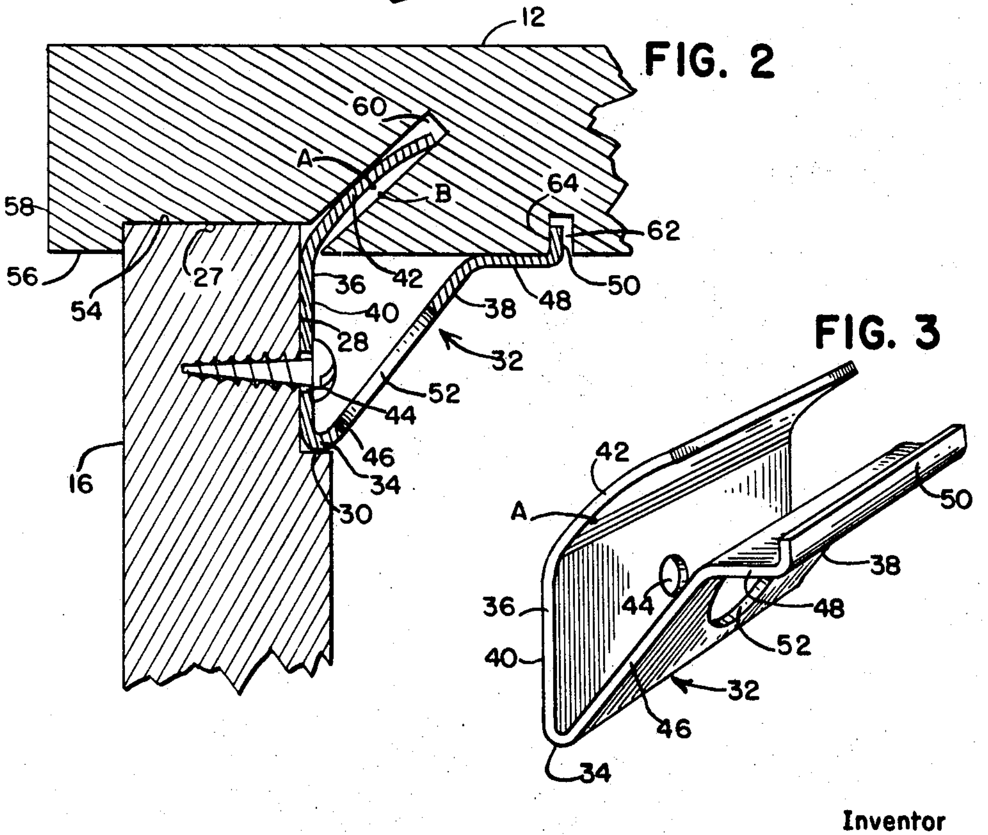
FIG. 2 is an enlarged, partial sectional view of one edge of a television receiver cabinet taken along line 2—2 of FIG. 1, showing a cabinet top and side-wall associated with each other by means of an assembly clip fastened to the side-wall.
FIG. 3 is a perspective view of the assembly clip shown in FIG. 2.

As best seen in FIG. 2, side-wall 16 includes an upper edge 27, and a rabbet 28, the lower portion of which forms a shelf 30 approximately parallel to upper edge 27.

A resilient assembly clip (FIGS. 2 and 3), generally referred to by reference numeral 32, is fabricated of spring metal or the like and is positioned with its apex 34 resting firmly on shelf 30 of rabbet 28, thus providing a secure base for preventing downward movement thereof.

The resilient assembly clip includes an anchoring arm 36 and a stabilizing arm 38 joined together at apex 34. The anchoring arm comprises an arcuate portion 42 formed at its extremity, and a planar portion 40 adjacent apex 34. Planar portion 40 contains an aperture 44 for mounting resilient assembly clip 32 in rabbet 28 of side-wall 16 in any convenient manner. Stabilizing arm 38 also includes a planar portion 46 adjacent apex 34. The opposite end of the stabilizing arm terminates in a horizontal portion 48, which is parallel to upper edge 27, and an upwardly extending flange 50, perpendicular thereto. In its relaxed state, the assembly clip is shaped so that the upwardly extending flange is spaced a first distance from the midpoint A of the inner periphery of arcuate portion 42. A relative large access opening 52 is provided in the stabilizing arm directly opposite aperture 44 for easy insertion of the proper clip mounting tools such as a screw-driver or socket wrench.

The lower surface of cabinet top 12 is provided with a channel 54 and an overhanging edge 56 juxtaposed thereto. The channel is routed in the underside of the cabinet top in any manner well known in the woodworking arts and it concurrently forms overhanging edge 56 which comprises the material between one side of the channel and a marginal edge 58 of the cabinet top.

The lower surface of the cabinet top also includes an anchoring kerf 60 and a stabilizing kerf 62. The anchoring kerf is cut in any well known manner at a point through the corner of channel 54 opposite the overlapping edge to form an acute angle of approximately 45° with the lower surface of the cabinet top. The stabilizing kerf is cut substantially perpendicular to the lower surface of the cabinet top and includes a supporting wall 64 parallel to rabbet 28. The supporting wall is located a second distance, greater than the first distance, from a mid-point B of the closest wall of the anchoring kerf.

The cabinet manufacturer mounts each resilient assembly clip adjacent one of the cabinet sidewalls, and positions it so that its apex rests on shelf 30. The mounting means may be any convenient fastening device, such as a wood screw inserted through the mounting aperture. A plurality of resilient assembly clips are secured along the rabbet at, for example, the locations indicated by reference numerals 66 as seen in FIG. 1. Obviously, the second side-wall 18 is constructed as a mirror of side-wall 16.

At this point the cabinet side-walls and top wall have been cut, routed, and prefinished by the cabinet manufacturer and a metal bottom wall for mounting the chassis has been provided. The manufacturer has also mounted the resilient assembly clips to the side-walls and the parts are merely stacked, crated, and shipped to the production facility where they are assembled by mating a cabinet top with a right and a left side-wall. Since the cabinet parts are made on a mass production basis, and a reasonable amount of care is taken as to accuracy and alignment, any cabinet top will mate perfectly with any pair of cabinet sidewalls of the same design and finish.

The knock down television cabinet is assembled by positioning each side-wall, in turn, perpendicular to top 12 and aligned with its corresponding channel 54 and pair of kerfs 60 and 62, but laterally apart therefrom. Upper edge 27 of each side-wall is fitted into channel 54 and the entire side-wall with resilient assembly clips attached, is slid along the channel. The arcuate portions of each anchoring arm 36 and the upward flanges of each stabilizing arm 38 enter and engage their respective kerfs as each side-wall is further mated with the cabinet top.

Since the distance between upward flange 50 and the inner periphery of arcuate portion 42 of the anchoring arm is slightly less than the distance between supporting wall 64 of the stabilizing kerf and the closest wall of the anchoring kerf, assembly will not always involve a simple sliding procedure. Nonetheless it is easily accomplished by lightly tapping the cabinet side-wall in the proper lateral direction with a soft rubber mallet or simply the palm of the hand, and at the same time slightly rocking the side-wall. Ordinarily these actions will be enough to overcome the opposing friction between upward flange 50 and supporting wall 64, arcuate portion 42 and the wall of anchoring kerf 60, and rectangular channel 54 and upper edge 27 of the cabinet side-wall.

As each of the plurality of resilient assembly clips is inserted within the kerfs, its arms are spread slightly, placing apex 34 in tension. The inner periphery of arcuate portion 42 maintains a relatively firm contact with the adjacent wall of the anchoring kerf, thus preventing the top from being lifted upwardly, or shifted to the left. Overlapping edge 56 of the cabinet top prevents the top from shifting to the right because of its contact with the cabinet side-wall. Flange 50 also assists in this regard. The stabilizing arm serves a dual function, first, insuring a firm bite of the arcuate portion into the anchoring kerf, hence preventing removal thereof in any manner but that in which it was assembled, and secondly serving as a corner bracket or partial cross-member for increasing the stability of the cabinet corner.

Bottom wall 14 is secured to each of the side-walls by suitable means, or if preferred, resilient assembly clips can be utilized in a manner similar to that described for the top wall. An escutcheon 20 will generally tie the front of the cabinet together, and angular corner brackets, not shown, may also be used for increasing the rigidity of the cabinet assembly. The escutcheon and angular corner brackets would also serve as positive means for preventing the side-walls from sliding out of engagement with the cabinet top. Should it become necessary to disassemble the cabinet this may be easily accomplished by removing the escutcheon plus any corner brackets, and simply sliding the assembly clips out of engagement with the kerfs.

What has been described is an inexpensive, reliable, simple and novel combination of elements for assembling a prefabricated, knock down television cabinet. It is recognized that many modifications and alterations of the invention, far different both in appearance and details of construction from the embodiments herein illustrated, but nevertheless utilizing the basic teachings of the invention, will be readily apparent or devised upon study by persons skilled in the art. Accordingly, the scope of the protection to be afforded should not be limited by the particular embodiment illustrated and described, but should be determined from the descriptions of the essence of the invention which appear in the appended claims.

The embodiments of the invention in which an exclusive property or privilege is claimed are defined as follows:

1. In a prefabricated enclosure the combination of: a first planar side; a second planar side interlocking said first planar side and having a pair of parallel grooves therein; a resilient assembly means securely affixed to said first planar side; said resilient assembly means including a pair of connected and angularly disposed legs each engageable with a respective one of said pair of parallel grooves whereby said first planar side is maintained in fixed association with said second planar side.

2. In a prefabricated enclosure the combination of: a first planar side; a second planar side including an edge overlapping said first planar side increasing the relative stability therebetween; said second planar side also including a pair of substantially parallel grooves therein; a substantially V shaped resilient assembly clip having a first leg and a second leg; means securing said first leg to said first planar side; said first leg and said second leg each having means engageable with respective ones of said pair of substantially parallel grooves whereby said first planar side is maintained in rigid association with said second planar side.

3. In combination: a first enclosure side; and a second enclosure side having a retaining edge overlapping said first enclosure side, a stabilizing kerf, and an anchoring kerf; a substantially V shaped resilient assembly clip comprising an anchoring leg and a stabilizing leg; means securing said anchoring leg to said first enclosure side; said anchoring leg terminating in an arcuate portion engageable and co-operable with said anchoring kerf; said stabilizing leg having a flat portion terminating in an upwardly projecting flange engageable with said stabilizing kerf whereby said first enclosure side is maintained rigidly associated with said second enclosure side.

4. In combination: a first enclosure side; a substantially V shaped resilient assembly clip; a second enclosure side having an edge overlying and adjacent said first enclosure side for resisting movement therebetween; said second enclosure side containing a substantially perpendicular stabilizing kerf of rectangular cross section; said second enclosure side also having an anchoring kerf of rectangular cross section in spaced relation with said stabilizing kerf and angularly disposed thereto; said assembly clip including a first leg terminating in an inwardly bowed portion co-operable with said anchoring kerf and a second leg angularly disposed to said first leg; said second leg having a substantially flat portion terminating in an upwardly projecting flange engageable with said stabilizing kerf whereby said first enclosure side is maintained firmly associated with said second enclosure side.

5. In combination: a first enclosure side; a second enclosure side having an interlocking edge and a surface abutting said first enclosure side for preventing movement thereof in two directions; said second enclosure side containing a stabilizing kerf and an anchoring kerf each of substantially rectangular cross section; said anchoring kerf spaced a first distance from said stabilizing kerf and angularly disposed thereto; a substantially V shaped resilient assembly clip having a first leg and a second leg; said first leg having a planar section secured to said first enclosure side and an inwardly bowed portion insertable into said anchoring kerf and retainable therein by friction between a wall of said kerf and the inner periphery of said bowed portion; said bowed portion preventing movement of said second enclosure side relative to said first enclosure side in the remaining two directions; said second leg including a substantially flat section terminating in an upwardly projecting flange insertable into said stabilizing kerf; the perpendicular distance between the planar section of said first leg and said upwardly projecting flange being less than the first distance between said kerfs; said projecting flange retained in said stabilizing kerf by friction responsive to the tensive condition of said assembly clip whereby said first enclosure side is maintained in fixed association with said second enclosure side.

References Cited

UNITED STATES PATENTS

| | | | |
|---|---|---|---|
| 1,063,086 | 5/1913 | Tietz | 312—263 |
| 2,111,888 | 3/1938 | Corey | 287—20.92 |

CARL W. TOMLIN, *Primary Examiner.*

W. L. SHEDD, *Assistant Examiner.*